United States Patent [19]

Bunn, Jr. et al.

[11] 4,035,153
[45] July 12, 1977

[54] FLUIDIZED CRACKING CATALYST REGENERATION APPARATUS

[75] Inventors: Dorrance P. Bunn, Jr.; Dale Williams; Henry B. Jones, all of Houston; John P. MacLean, Stafford, all of Tex.

[73] Assignee: Texaco Inc., New York, N.Y.

[21] Appl. No.: 684,509

[22] Filed: May 7, 1976

[51] Int. Cl.$^2$ .................... B01J 8/08; B01J 37/12
[52] U.S. Cl. .................... 23/288 B; 23/288 S; 208/164; 252/417
[58] Field of Search ........... 23/288 B, 288 S, 284; 252/417; 208/164; 423/659 F

[56] References Cited

U.S. PATENT DOCUMENTS

| | | | |
|---|---|---|---|
| 2,422,793 | 6/1947 | McAfee | 23/288 S X |
| 2,446,247 | 8/1948 | Scheineman | 23/288 S X |
| 2,610,909 | 9/1952 | Hunter | 23/288 S |
| 2,879,145 | 3/1959 | Rice | 23/288 S |
| 3,826,624 | 7/1974 | Jones et al. | 23/288 S |
| 3,903,016 | 9/1975 | Owen | 23/288 B X |
| 3,953,175 | 4/1976 | Pulak | 23/288 S X |

FOREIGN PATENT DOCUMENTS

| | | | |
|---|---|---|---|
| 63,626 | 7/1949 | Netherlands | 23/288 S |

Primary Examiner—Joseph Scovronek
Assistant Examiner—Roger F. Phillips
Attorney, Agent, or Firm—Carl G. Ries; Thomas H. Whaley; Douglas H. May, Jr.

[57] ABSTRACT

Apparatus for regeneration of spent, coke contaminated fluidized cracking catalyst by burning coke therefrom with a molecular oxygen containing regeneration gas in a fluidized dense phase bed, and for burning substantially all carbon monoxide to carbon dioxide. Means are provided for transferring heat from the top of said regeneration apparatus to the bottom, employing catalyst as the transfer medium. Additionally, means are provided for maintaining a homogeneous fluidized dense phase bed of catalyst undergoing regeneration. Also, conical standpipe means is provided for deaerating regenerated catalyst.

7 Claims, 1 Drawing Figure

U.S. Patent  July 12, 1977  4,035,153
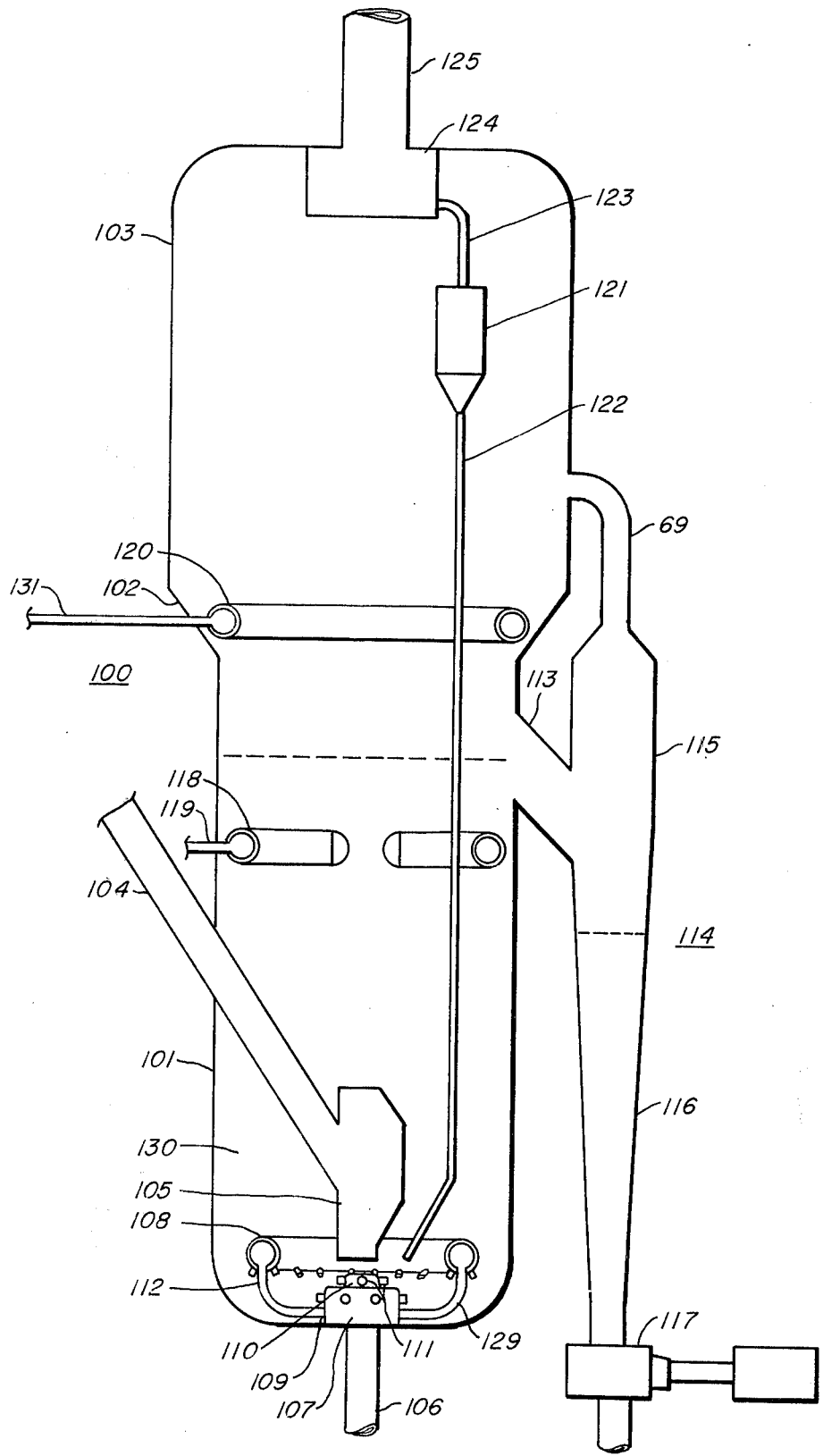

FLUIDIZED CRACKING CATALYST REGENERATION APPARATUS

The present invention relates to fluidized catalytic cracking of hydrocarbons. In particular, the present invention relates to apparatus for regeneration of zeolitic molecular sieve containing fluidizable catalytic cracking catalyst.

Fluidized catalytic cracking processes are well known and widely practiced in petroleum refineries. Such processes comprise contacting hydrocarbon charge with hot regenerated fluidized cracking catalyst in a reaction zone under cracking conditions for conversion of the hydrocarbon charge into cracked hydrocarbon products with the concomitant deposition of carbonaceous materials (coke) upon the catalyst; separating cracked hydrocarbon vapors from the coke contaminated catalyst (spent catalyst) within the reaction zone; recovering as product the cracked hydrocarbon vapors essentially free of entrained catalyst; stripping, in a stripping zone, volatile hydrocarbons from the spent catalyst by contact with stripping vapors; regenerating, in a regeneration zone, the coke contaminated stripped catalyst by burning coke therefrom with a molecular oxygen containing regeneration gas at an elevated temperature for restoring activity to the regenerated catalyst; and contacting hot, regenerated catalyst with additional hydrocarbon charge in the reaction zone, as described above.

In fluidized catalytic cracking processes for conversion of normally liquid hydrocarbons, such as petroleum fractions, into lower boiling hydrocarbons, it is well known to employ catalyst comprising zeolytic aluminosilicate molecular sieves to obtain increased conversion of hydrocarbon charge into useful, lower boiling hydrocarbons, particularly into naphtha fractions useful as motor fuels. Such catalysts comprise an amorphous matrix such as silica-alumina, silica magnesia, etc. containing a minor portion of a crystalline zeolytic aluminosilicate molecular sieve having uniform crystalline pore openings which has been ion exchanged with rare earth ions, magnesium ions, hydrogen ions, ammonium ions and/or other divalent and polyvalent ions for reduction of the sodium content of said molecular sieve to not more than one weight percent, and preferably less. These cracking catalysts (hereinafter referred to as "zeolite catalysts") are well-known and commercially available. The activity and selectivity of such zeolite catalysts for conversion of hydrocarbon charge stocks into useful cracked hydrocarbon products, particularly naphtha, are particularly affected by residual carbon remaining on regenerated catalyst. For obtaining the full utility and benefit of the activity and selectivity of such zeolite catalysts, carbon on regenerated catalyst is maintained below 0.2 weight percent, and preferably 0.07 weight percent or less.

SUMMARY OF THE INVENTION

Now, according to the present invention improved apparatus is disclosed for regeneration of spent, coke contaminated zeolite cracking catalyst, by burning coke therefrom with a molecular oxygen containing regeneration gas to produce a flue gas comprising oxides of carbon and regenerated catalyst containing 0.1 weight percent or less residual carbon.

Advantages of the improved regeneration apparatus of the present invention include improved regeneration of spent zeolite cracking catalyst to provide a regenerated catalyst having less than 0.1 weight percent residual carbon thereon, and produce a flue gas substantially free of carbon monoxide. These and other advantages will be further discussed in the Detailed Description of the Invention, which follows.

BRIEF DESCRIPTION OF THE DRAWING

The Drawing is a schematic representation of fluidized regeneration apparatus embodying improvements of the present invention.

DETAILED DESCRIPTION OF THE DRAWING

In order to demonstrate, and provide a better understanding of the invention, reference is now made to the Drawing. The Drawing is a schematic representation of fluidized catalytic cracking regeneration apparatus embodying improvements of the present invention. It is to be understood that the Drawing is only in such detail as required for a clear understanding of the present invention, and that various elements commonly employed in commercial apparatus, such as valves, pumps, instrumentation, etc. which are unnecessary for a complete description of the present invention have been omitted for the sake of clarity.

In the Drawing, fluidized cracking catalyst regeneration apparatus is shown, including a vertical regeneration vessel 100 comprising a lower regenerator section 101 which comprises a hollow cylinder having a a closed bottom and an open top; an open ended frustoconic transition section 102, the bottom of which is in axial alignment, and in communication with the open top of lower regeneration section 101; and an upper regeneration section 103, comprising a hollow cylinder having a closed top and an open bottom in axial alignment, and in communication with, the open top of said transition section 102. The internal cross-section area of lower regenerator section 101 is sufficient to provide a regeneration gas superficial vapor velocity in the range of about 2.0–6.0 ft/sec, and the volume of said lower regenerator section 101 is sufficient to provide a dense phase fluidized catalyst residence time of from about 3 minutes to about 20 minutes at flow rates and operating conditions contemplated. The walls of transition section 102 have a conic angle of about 20°–40° from the vertical and have sufficient height such that the increased cross-sectional area of the top of transition section 102 is sufficient for reducing the superficial vapor velocity of regeneration gas flowing therethrough from the range of about 2.5–6.0 ft/sec to the range of about 1.0–3.0 ft/sec. Upper regenerator section 103 is of the same diameter and cross-sectional area as the top of transition section 102.

In the Drawing, a spent catalyst distribution means 130 for introducing spent, coke contaminated catalyst from a reaction section (not shown) to regenerator vessel 100 comprises a spent catalyst conduit 104 directed downward at an angle of about 30°–45° from the vertical, attached to and in communication with the interior of a spent catalyst distributor 105 which comprises a vertical, hollow member having side walls, an open top, and an open bottom. Said spent catalyst conduit 104 passes through the side wall of lower regenerator section 101 and the lower, discharge end of said spent catalyst conduit 104 communicates with the interior of said spent catalyst distributor 105 via an opening through the side wall thereof. The open top and open bottom of spent catalyst distributor 105 are substantially in axial alignment with the vertical central axis of lower regenerator section 101, the open bottom of spent catalyst distributor 105 terminates above a regeneration gas distribution means (described below) near the bottom of lower regenerator section 101, and the open top of spent catalyst distributor 105 terminates in the lower portion of lower regenerator section 101. Spent catalyst from the reaction section (not shown) flows downwardly through spent catalyst conduit 104 into spent catalyst distributor 105, wherein any gas entrained in said spent catalyst is disengaged. Disengaged gas flows upward through the open top, and spent catalyst flows downward through the open bottom of spent catalyst distributor 105 into the interior of lower regenerator section 101.

In the Drawing, a primary regeneration gas conduit 106 passes upward through the bottom of lower regenerator section 101 as means for introducing molecular oxygen containing primary regeneration gas, e.g. air, into regenerator vessel 100. The discharge end of primary regeneration gas conduit 106 is in communication with a primary regeneration gas distribution means 129 which comprises an inlet gas plenum 107, in communication with a primary gas distributor 108.

In the Drwaing, inlet gas plenum 107 comprises a first hollow, vertical cylindrical member 109 having side walls and closed bottom and top and a second hollow, vertical cylindrical member 110 having side walls, an open bottom and a closed top and having a smaller diameter than cylindrical member 109. The discharge end of primary regeneration gas conduit 106 is in communication with the interior of inlet gas plenum 107 via an opening in the bottom of first cylindrical member 109. Second hollow, vertical cylindrical member 110, is in axially concentric alignment with said regenerator vessel 100 and is attached to the top of first cylindrical member 107 such that communication is established there between via an opening in the top of first cylindrical member 109 and the open bottom of second cylindrical member 110. The top of said second cylindrical member 110 is below the bottom opening of said catalyst distributor 105 at a vertical distance equivalent to about 1/2 to 1 diameter of said bottom opening of catalyst distributor 105. Preferably, the diameter of one-half second cylindrical member 110 is about equal to one-half the diameter of the bottom opening of catalyst distributor 105 such that the closed top of second cylindrical member 110 serves as an impingement plate for spent catalyst discharging from catalyst distributor 105. A plurality of nozzles 111 are attached to and in communication with the interior of the vertical walls of said first and second cylindrical members, 109 and 110 respectively, for radially distributing regeneration gas from inlet gas plenum 107 into the lower portion of lower regenerator section 101. Nozzles 111 are positioned at an angle within the range of from about +20° to about −20° from the horizontal. Nozzles 111 have a total cross-sectional area sufficient to provide nozzle exit velocities in the range of 65–175 ft/sec when from about 25–40 percent of gas flowing through regeneration gas conduit 106 exits inlet gas plenum via nozzles 111 into regenerator vessel 100, such that spent catalyst from catalyst distributor 105 and regeneration gas from nozzles 111 are intimately mixed and radially distributed within the bottom of lower regenerator section 101.

In the Drawing, one or more conduit pipes 112 are shown in communication with inlet gas plenum 107 and primary gas distributor 108 for supplying about 60–75 percent of the gas from regeneration gas conduit 106 to primary gas distributor 108. Primary gas distributor 108 comprises a pipe forming a ring having a plurality of openings directed downward at an angle within the range of about 30° to 60° from the horizontal for radially distributing a primary regeneration gas within the bottom of lower regenerator section 101. The total cross-sectional area of said openings in primary gas distributor 108 is sufficient to provide a primary regeneration gas discharge velocity in the range of about 65–175 ft/sec. when from 60 to 75 percent of the primary regeneration gas from primary regeneration gas conduit 106 flows therethrough.

In the Drawing, lower regenerator section 101 has a cross-sectional area sufficient to provide for a superficial vapor velocity in the range of from about 2.0 to 6.0 ft/sec of the primary regeneration gas flowing upward therethrough, such that spent catalyst and primary regeneration gas form a fluidized dense phase bed of catalyst. The volume of lower regenerator section 101 is sufficient to provide an average residence time of about 3 to 20 minutes for spent catalyst in the fluidized dense phase bed such that substantially all the coke may be burned therefrom at a specific coke burning rate within the range of about 0.05 to 1 pounds of coke per hour per pound of catalyst in the fluidized dense phase catalyst bed, at regeneration temperatures within the range of about 1150° to 1400° F.

In the Drawing, a regenerated catalyst ductway 113 communicates between the upper portion of lower regenerator section 101 and an external regenerated catalyst standpipe 114. Regenerated catalyst ductway 113 is inclined at an angle in the range of about 30° to 60° from the vertical such that regenerated catalyst from the upper portion of the fluidized dense phase catalyst bed maintained in lower regenerator section 101 will flow downwardly through regenerated catalyst ductway 113 into the upper portion of external regenerated catalyst standpipe hopper 114. Regenerated catalyst standpipe 114 comprises an upper vertical cylindrical section 115 having a cylinder wall, an open top and an open bottom and a lower truncated conical section 116 having an open top and open bottom Communication of regenerated catalyst ductway 113 with upper standpipe section 115 is through said vertical cylinder wall. The open top of lower standpipe section 116 is in communication with the open bottom of upper standpipe section 115, and the walls of lower standpipe section 116 have a conical angle in the range of about 3–7° from the vertical. Within said lower standpipe section 116, hot regenerated catalyst from regenerator vessel 100 is deaerated. A slide valve 117, in communication with the bottom of lower standpipe section 116 allows withdrawal of deaerated, regenerated catalyst at a controlled rate for contact with a hydrocarbon charge stock in a fluidized catalytic cracking reaction section (not shown).

In the Drawing, gas entering regenerated catalyst standpipe 114 with regenerated catalyst from reactor vessel 110, accumulates in upper standpipe section 115. A deaerated gas conduit 69 is in communication with the open top of upper standpipe section 115 and upper regenerator section 103 for removing such accumulated deaerated gas from regenerated catalyst standpipe 114 to the upper portion of regenerator vessel 100.

In the Drawing, within the upper portion of lower regenerator section 101, below regenerated catalyst ductway 113, a plurality of trim gas injection means 118 are provided for injection of additional amounts of molecular oxygen containing gas in an amount equivalent to about 1–10% of primary regeneration gas. Each of said trim gas injection means 118 preferably comprises essentially horizontal pipe having a plurality of openings for radially distributing trim gas downwardly into regenerator vessel 100 at an angle in the range of about 30° to 60° from horizontal. Trim gas is independently supplied to each of said trim gas distributors 118 via a plurality of trim gas conduits 119.

In the Drawing, as previously stated, the open top of lower regenerator section 101 is in communication with the open bottom of transition section 102, for allowing flow of regeneration gas and entrained catalyst from the upper surface of the fluidized dense phase catalyst bed maintained in lower regenerator section 101 into upper regenerator section 103 wherein a dilute phase of catalyst suspended in regeneration gas is maintained. Regeneration gas disengaging the fluidized dense phase catalyst bed may be substantially depleted in oxygen, and may contain a substantial concentration of carbon monoxide from incomplete combustion of coke in the fluidized dense phase bed. Such carbon monoxide is desirably combusted to carbon dioxide in regenerator vessel 100. Within regenerator transition section 102, secondary regeneration gas distributor 120 is positioned horizontally for injection of additional oxygen containing regeneration gas into regenerator vessel 100 for substantially complete combustion of carbon monoxide to carbon dioxide. Secondary regeneration gas distributor 120 comprises a horizontal header having a plurality of openings for radially distributing secondary regeneration gas into said transition section 102 at an angle of from about 30° to about 60° downward from horizontal. Total cross-sectional area of openings in said secondary regeneration gas distributor 120 is such that the discharge velocity of secondary regeneration gas does not exceed about 200 ft/sec when the rate of secondary regeneration gas is equivalent to about 50 percent of primary regeneration gas entering regeneration vessel 100 via regeneration gas conduit 106. Secondary regeneration gas is supplied to secondary regeneration gas distributor 120 via conduit 131. Secondary regeneration gas distributor 120 is located at a height in regenerator transition section 102 such that the superficial vapor velocity of gasses flowing past secondary regeneration as distributor in regenerator transition section 102 does not exceed about 3.5 ft/sec when superficial vapor velocity in first regenerator section is in the range of 2.0 to 6.0 ft/sec.

In the Drawing, the open top of regenerator transistion section 102 is in communication with the open bottom of upper regenerator section 103 for flow of regeneration gas and entrained catalyst into the dilute catalyst phase maintained in upper regenerator section 103. The cross-sectional area of upper regenerator section 103 is such that the superficial vapor velocity of gas flowing therethrough is in the range of about 1.0 to 3.0 ft/sec. Within upper regenerator section 103, catalyst-gas separation means, preferably cyclone separators, are provided for separating entrained catalyst from spent regeneration gas. Within the present invention, it is contemplated that catalyst-gas separation means 121 may compirse one or more cyclone separators in 1 to 3 stages in series and with 1 or more parallel arrangement for substantially completely separating the entrained catalysts from the spent regeneration gas. For the purposes of clarity, only one separator 121 is shown. Line 122, in communication with the bottom of separator 121 extends downward into the lower regenerator section 101, terminating at about the level at which spent catalyst discharges from spent catalyst distributor 105. Entrained catalyst, separated from spent regeneration gas in separator 121 flows downward at regeneration temperature through line 122 and discharge into the bottom of lower regenerator section 101 wherein the hot catalyst mixes with spent catalyst and primary regeneration gas, increasing the temperature thereof and improving the initiation of coke burning on the spent catalyst.

In the Drawing, Line 123 communicates with the top of separator 121 and a plenum 124. Plenum 124 is attached to the top of upper regenerator section 103. Separated spent regeneration as, separated from entrained catalyst in catalyst-gas separator 121 flows through line 123 into plenum 124. A vent line 125 communicating with plenum 124 provides means for removing spent regeneration gas from the fluidized catalytic cracking unit, as a flue gas.

Fluidized catalytic cracking units employing the improved regeneration apparatus of the present invention are operated for the conversion of hydrocarbon charge stock into lower boiling cracked hydrocarbons and coke. Such conversion of hydrocarbon charge is accomplished by contacting hydrocarbon charge with hot regenerated catalyst under cracking conditions in a fluidized catalytic cracking reaction zone. Hydrocarbon charge and regenerated catalyst may be contacted in a riser transport reactor, in a reactor vessel containing a dense phase fluidized bed of catalyst fluidized by the up-flowing hydrocarbon charge vapors, or in a reactor zone comprising both a riser transport zone and a dense phase catalyst bed. Reaction conditions for conversion of hydrocarbons charge include reaction temperatures in the range of about 850–1100° F, reaction pressures in the range of 5–50 psig, regenerated catalyst to hydrocarbon charge wieght ratios (catalyst-/oil ratios) of from about 2:1 to about 20:1, catalyst and hydrocarbon contact times of from about 10 seconds to about 5 minutes, and reactor superficial vapor velocities of 0.8 to 3.0 ft/sec. In such a fluidized catalytic cracking process, hydrocarbon charge and hot regenerated catalyst are contacted at such reaction conditions for conversion of the hydrocarbon charge into lower molecular weight hydrocarbons. A substantial portion of the hydrocarbons in contact with the catalyst are in vapor phase with a minor portion being present as liquid phase or solid phase. Such solid and liquid hydrocarbons collect upon the catalyst particles, resulting in a decrease of catalyst activity. Catalyst containing such hydrocarbons is referred to as spent catalyst. In such a fluidized catalytic cracking process spent catalyst is treated for removal of such accumulated hydrocarbons and for regeneration of cracking activity. From the reaction zone of a fluidized catalytic cracking process, spent catalyst containing accumulated hydrocarbons is commonly transferred to a stripping zone wherein the spent catalyst is contacted with a stripping vapor (e.g. steam) at a temperataure in the range of about 750–1100° F for vaporization of at least a portion of the volatile hydrocarbons accumulated upon the catalyst. Volatilized hydrocarbons and stripping vapors are transferred, from the stripping zone to the reaction zone. Stripped catalyst containing nonvolatile hydrocarbon residues (commonly referred to as coke), is transferred to a regeneration zone wherein catalytic activity is restored to said catalyst by burning such coke from the catalyst with a molecular oxygen containing regeneration gas at an elevated temperature. Upon regeneration, hot regenerated catalyst, having restored activity is transferred from the regeneration zone for contact with additional hydrocarbon charge in the reaction zone, as described above.

Catalysts, the regeneration of which the regeneration apparatus of the present invention is well suited, include those catalyst commonly referred to as "zeolite" or "molecular sieve" cracking catalysts. Such catalyst will be referred to herein as zeolite catalyst for convenience in the discussion which follows. Such zeolite catalysts comprise about 95–85wt% amorphous refractory metal oxide matrix, and about 5–15wt% (preferably 8– wt%) crystalline aluminosilicate zeolitic molecular sieves having uniform crystalline pore openings. Said matrix generally has substantial cracking activity and is selected from naturally occuring clays, and synthetic oxide mixtures such as silica-alumina, silica magnesia, silica-zirconia, etc. The zeolite portion of such zeolite cracking catalyst comprises small particles of either natural or synthetic crystalline, alumino-silicate zeolitic molecular sieves, such as faugasite, chabazite, X-type or Y-type alminosilicate molecular sieves, etc. having a major portion of their sodium content replaced by ion exchange with magnesium ions, rare earth ions, ammonium ions, hydrogen ions, and/or other divalent and polyvalent ions which enhance the activity of the catalyst. The apparatus of the present invention is particularly well suited for use in regenerating those zeolite cracking catalysts promoted for increasing the rate of burning carbon monoxide to carbon dioxide within the regeneration zone. Such promoted zeolite catalysts may have controlled crystalline pore size, and contain small amounts of material such as plantinum, nickel, iron, and other materials which catalyze the combustion of carbon monoxide to carbon dioxide at temperature commonly employed in the regeneration of cracking catalysts.

Spent cracking catalyst, when transferred to a regeneration zone, such as described herein, contains from about 0.5 wt.% to about 2.0 wt.% coke. In regenerating such spent catalyst, wherein the coke is burned from the catalyst to restore catalytic activity thereto, zeolite catalyst may be subjected to temperatures somewhat above 1325° F without substantially degrading their catalytic activity. At temperatures above about 1500° F, the structure and/or composition of the catalyst is affected in such a way that the catalyst irreversable loses at least a portion of its catalytic acitivty.

Regeneration of catalyst in a fluidized catalytic cracking process comprises burning coke therefrom at an elevated temperature with a molecular oxygen containing regeneration gas. Generally, the regeneration gas is air, although other regeneration gases containing molecular oxygen, such as oxygen enriched air, steam and air mixtures, etc. may also be employed. The degree of regeneration of catalytic activity of a spent cracking catalyst is proportional to the degree of removal of coke from said catalyst. Lower residual carbon content of regenerated catalyst results in higher regenerated catalyst activity. The regenerated catalyst activity of zeolite cracking catalyst appears to be somewhat more sensitive to residual carbon than the regenerated activity of an amorphous cracking catalyst. Preferably, residual carbon content of regenerated catalyst is reduced to about 0.1 weight percent or less.

Hydrocarbon charge stocks within contemplation of the present invention are those which may be cracked to yield useful lower molecular weight hydrocarbon products. Examples of hydrocarbon charge stocks include virgin gas-oils, vacuum gas oils, atmospheric residua, topped crudes shale oils, tar sand oils, virgin naphthas, and cycle oil and cracked naphtha recycle streams from cracking processes, etc. A portion of all such hydrocarbon charge stocks when subjected to fluidized catalytic cracking are converted into coke. The portion of hydrocarbon charge stock which is converted into coke is proportional to the boiling range of the particular charge stock and will vary from about 1 weight percent for some naphthas to about 10 weight percent or more for some residua.

In a process employing the regeneration apparatus of the present invention, spent cracking catalyst containing about 0.5 to 2.0 weight percent coke is transferred downward through spent catalyst distribution means 130 into the axial center of a first regeneration zone maintained in the bottom of lower regenerator section 101, wherein said spent catalyst is contacted with a primary regeneration gas flowing radially into said first regeneration zone under turbulent flow conditions for intimately mixing said spent catalyst and regeneration gas, and evenly distributing the resulting mixture across the cross-sectional area of said first regeneration zone. Primary regeneration gas is supplied to the first regeneration zone via primary gas distributing means 129 in an amount sufficient to provide about the stoichometric molecular oxygen required for complete combustion of coke on spent catalyst to carbon dioxide and water. Spent catalyst entering said first regeneration zone is at a temperature in the range of about 750–1100° F, and primary regeneration gas entering the first regeneration zone is at a temperature in the range of about 100°–600° F, such that combusion of coke upon spent catalyst is initiated. Residence time of spent catalyst in said first regeneration zone is sufficient for obtaining even distribution of spent catalyst and primary regeneration gas across the cross-sectional area of the lower regenerator section 101 and is in the range of about 10 seconds to 1 minute. From said first regeneration zone spent catalyst and regeneration gas flow upwardly into a second regeneration zone maintained in the upper portion of lower regenerator section 101. In said second regeneration zone, operating conditions are maintained such that a dense phase bed of catalyst undergoing regeneration is fluidized by the upward flow of the primary regeneration gas and wherein substantially all the coke is burned from the catalyst undergoing regeneration. In the second regeneration zone the dense phase fluidized bed of catalyst has a density in the range of about 20–30 pounds per cubic foot and has an upper surface above which is superimposed a dilute phase of catalyst suspended in regeneration gas. Operating conditions within the second regeneration zone for maintaining the fluidized phase catalyst bed and obtaining the degreeof regeneration desired, include regeneration temperataures in the range of about 1050–1350° F, regeneration pressures at the top of the dense phase catalyst bed in the range of about6–50 psig, the regeneration gas superficial vapor velocities upward through the dense phase bed in the range of about 1.0 to 6.0 ft/sec, catalyst residence time in the dense phase bed in the range of 3 to 20 minutes, and a specific coke burning rate, based upon the inventory of catalyst in the dense phase bed, in the range of about 0.05 to 1.0 pounds of coke per hour per pound of catalyst. Under these regeneration conditions, residual carbon on regenerated catalyst may be reduced to 0.1 weight percent or preferably 0.05 weight percent or less.

In the present invention, distribution of primary regeneration gas and catalyst in the first regeneration zone in such as to provide an even distribution of primary regeneration gas and catalyst across the cross-sectional area of the second regeneration zone. By this means a homogeneous fluidized dense phase bed of catalyst is established thus providing even regeneration, of catalyst within the second regeneration zone. For improving regeneration of catalyst, and overcoming any nonhomogeneity within the fluidized dense phase bed, trim gas, comprising oxygen in an amount from about 1 to 5 mole percent of the stoichometric oxygen required for complete combustion of coke to carbon dioxide and water is injected selectively through a plurality of trim gas injection means 118 located below the upper surface of the fluidized dense pahse bed. Trim gas is injected so that additional oxygen may be provided to portions of the fluidized dense phase bed which may be oxygen deficient, thereby providing for an equal degree of regeneration of catalyst across the cross-sectional area of the dense phase bed.

In the present invention, regenerated catalyst is withdrawn from the upper portion of the dense phase fluidized catalyst bed above the injection of trim gas and below the upper surface of said fluidized catalyst bed via regenerated catalyst ductway 113 which does not have projections which may impede the smooth flow of catalyst and vapors within the fluidized dense phase catalyst bed. Regenerated catalyst from said regenerated catalyst ductway 113 flows into a regenerated catalyst standpipe 114 wherein regenerated catalyst disengages regeneration as entrained therein to form a settled bed of regenerated catalyst in the lower standpipe section 116. Hot regenerated catalyst is transferred from the lower standpipe section 116 for contact with additional hydrocarbon charge stock in the reaction zone of the fluidized catalytic cracking process. Regeneration gas separated from the regenerated catalyst flows from the upper standpipe section 115 into the dilute catalyst phase which superimposes the dense phase fluidized catalyst bed via line 69.

In the present invention, regeneration gas comprising nitrogen, carbon dioxide, carbon monoxide steam, and substantially spent in molecular oxygen, and a small amount of catalyst entrained therein, disengages the upper surface of the fluidized dense phase catalyst bed forming a dilute phase which enters conical transition section 102 wherein the cross-sectional area of the regenerator vessel 100 is increased such that the superficial vapor velocity of the spent regeneration decreases to a value in the range of 1.0 to about 3.0 ft/sec. Density of this dilute phase of catalyst suspended in spent regeneration gas is in the range of about 0.1 to 1.0 pounds per cubic foot. Upon decreasing the superficial vapor velocity of spent regeneration gas within the transition zone, substantial amounts entrained catalyst return, under the influence of gravity, to the top of the dense phase fluidized catalyst bed. The ratio of carbon dioxide to carbon monoxide within this spent regeneration gas may vary from about 1:1 to about 500 to 1 or greater depending upon operating conditions within said fluidized dense phase catalyst bed. As carbon monoxide is a serious air pollutant, it is desirable that as much as possible be burned to carbon dioxide within the regeneration vessle 100. With unpromoted zeolite containing fluidized cracking catalyst in the regeneration zone dense phase fluidized catalyst bed, increased temperatures result in increased combustion of carbon monoxide to carbon dioxide such that at about 1350° F the carbon monoxide content of the spent regeneration gas leaving the dense phase bed will be less than 1% by weight under regeneration conditions employed herein. When catalyst prmoted for combustion of carbon monoxide to carbon dioxide are employed, essentially complete combustion of carbon monoxide to carbon dioxide may be obtained at substantially lower temperatures in the range of about 1250° F. In the event that combustion of carbon monoxide in the dense phase fluidized bed is incomplete and substantial amounts of carbon monoxide are present in spent regeneration gas entering the transition zone, secondary regeneration gas, sufficient to provide from about 1 to about 33 mole percent of the stoichometric amount of oxygen required for complete combustion of the coke on spent catalyst, is introduced into the dilute phase of comprising spent regeneration gas and catalyst via secondary regeneration gas distribution means 120 at an elevation within said transition zone such that the superficial velocity of the dilute phase flowing upward through the transition zone does not exceed about 3.5 ft/sec. This additional oxygen injected into the dilute phase enhances substantially complete combustion of carbon monoxide to carbon dioxide. The portion of catalyst entrained in the spent regeneration gas which falls back to the upper surface of the dense phase fluidized catalyst bed from the transition zone under the influence of gravity carries a substantial amount of the heat generated from the combustion of CO to $CO_2$ back to the dense phase fluidized catalyst bed, such that the temperature of the dilute phase does not increase above the temperature at which entrained catalyst will be deactivated (e.g. about 1450° F).

In the present invention, the dilute phase comprising spent regeneration gas and catalyst, having carbon monoxide essentially completely burned to carbon dioxide, exits the top of said transition section 102 into a third regeneration zone contained within upper regeneration section 103. From said third regeneration zone spent regeneration gas and entrained catalyst flow into catalyst-gas separators 121 wherein spent regeneration gas is essentially completely separated from said entrained catalyst. From said separators 121 spent regeneration gas flows into plenum 124 and is removed from the regeneration zone as a flue gas via vent line 125. Catalyst from the bottom of said separators 121 is returned to said first regeneration zone via line 122, whereupon said hot separated catalyst is initimately mixed with spent catalyst and regeneration gas entering said first regeneration zon for increasing the temperature therein such that combustion of coke is enhanced.

Thus, having described herein the apparatus of the present invention, and having described a method of using the apparatus, it is to be understood that no undue restriction be imposed by reason thereof, and that only such limitations are to be imposed as are contained in the appended claims.

We claim:

1. Fluidized catalyst regeneration apparatus, which comprises in cooperation:
   a. a vertical regenerator vessel (100) comprising a cylindrical lower regenerator section (101) having a closed bottom and an open top, a frusto-conic transition section (102) having an open top and an open bottom, and a cylindrical upper regenerator section (103) having a closed top and an open bottom, wherein the open top of lower regenerator section (101) is in direct communication with the open bottom of transition section (102) and wherein the open top of transition section (102) is in direct communication with the open bottom of upper regenerator section (103);
   b. spent catalyst distribution means (130) for transferring spent catalyst from outside said regenerator vessel (100) into about the axial center of the bottom portion of said lower regenerator section (101);
   c. primary regeneration gas distribution means (129), located below said spent catalyst distribution means 130 in axial alignment with the center line of said lower regenerator section (101), for distributing an oxygen containing primary regeneration gas radially into the bottom portion of said lower regenerator section (101);
   d. primary regeneration gas conduit (106), passing upwardly through the bottom of said lower regenerator section (101) and in open communication with said primary regeneration gas distribution means (129);
   e. a plurality of trim gas injection means (118) in the upper portion of lower regenerator section (101) for radially distributing oxygen containing gas into selected portions of the cross-sectional area of lower regenerator section (101);
   f. a regenerated catalyst standpipe (114) located outside reactor vessel (100), comprising an upper cylindrical standpipe section (115) having an opening in the side wall, having a top with an opening therein and having an open bottom, and a conical standpipe section (116) having an open top in communication with the lower open end of said upper standpipe section 115 and having an open bottom;
   g. a regenerated catalyst duct (113) having open ends, directed downwardly at an angle of about 45° to 60° from the vertical, wherein the open upper end of duct (113) is in communication with the interior of lower regenerator section (101) above said trim gas injection means (118) via an opening in the side wall of section (101), and wherein the open lower end of duct (113) is in communication with the opening in the side wall of upper cylindrical standpipe section (115);
   h. a deaeration gas line (69) for providing communication from the opening in the top of upper cylindrical standpipe section (115) to an opening in the side wall of upper regenerator section (103);
   i. secondary regeneration gas distribution means (120) for radially distributing an oxygen containing seondary regeneration gas into transition section (102);
   j. catalyst-gas separation means (121) within said upper regenerator section (103) for separating catalyst from spent regeneration gas;
   k. vent means in communication with said catalyst-gas separation means (121) for removing spent regeneration gas from said catalyst regeneration apparatus; and
   l. a vertical conduit (122), the upper end of which is in communication with catalyst-gas separation means (121), for transferring separated catalyst from said catalyst-gas separation means (121) to the bottom portion of said lower regenerator section (101).

2. The apparatus of claim 1 wherein said spent catalyst distribution means (130) comprise a spent catalyst conduit (104) passing through the wall of lower regenerator section (101) directed downward at an angle of about 30°–45° from the vertical, the discharge end of which is attached to and is in communication with a spent catalyst distributor (105) which comprises a vertical, hollow member having an open top and bottom substantially in axial alignment with the vertical axis of lower regenerator section (101), the open bottom of said spent catalyst distributor (105) terminating at a distance above said primary regeneration gas means (129) which is equivalent to about ½ to 1 diameter of said spent catalyst distributor (105), and the open top of said spent catalyst distributor (105) terminating in the lower portion of lower regenerator section (101).

3. The apparatus of claim 1 wherein said primary regeneration gas distributor means (129) comprises an inlet gas plenum (107) having a plurality of openings for the radial distribution of primary regeneration gas into said lower regenerator section (101), and in axial alignment with the centerline of regenerator vessel (100), a primary gas distributor (108) comprising a ring shaped pipe having a plurality of openings for radially distributing primary regeneration gas into regenerator vessel (100), and a conduit pipe (112) in open communication with both the inlet gas plenum (107) and primary gas distributor (108).

4. The apparatus of claim 3 wherein said inlet gas plenum (107) comprises a vertical cylindrical member (109) having openings in the top and bottom and having a plurality of openings for nozzles in the cylinder wall, a second vertical cylindrical member (110) having an open bottom and a closed top and having a plurality of openings for nozzles in the cylinder wall, said second cylindrical member (110) being of smaller diameter than said first cylindrical member (109), and a plurality of nozzles (119, wherein the discharge end of said primary regeneration gas conduit (106) communicates with the interior of first cylindrical member (109) via the opening in the bottom thereof wherein the open bottom of said second cylindrical member (110) is in open communication with the interior of first cylindrical member (109), through the opening in the top thereof, and wherein nozzles (111) are installed in the nozzle openings of first cylindrical member (109) and second cylindrical member (110).

5. The apparatus of claim 4 wherein said second cylindrical member (110) has a diameter equal to about one-half the diameter of the bottom opening of said spent catalyst distributor (105), wherein the top of said second cylindrical member (110) is at a distance below the bottom opening of spent catalyst distributor (105) at a distance equivalent to about ½–1 diameters of the bottom opening in spent catalyst distributor (105), wherein said first cylindrical member (109) is of larger diameter than second cylindrical member (110).

6. The apparatus of claim 5 wherein nozzles (111) are radially directed from the walls of first cylindrical member (109) and second cylindrical member (110) at an angle of about +20° to −20° from the horizontal, and wherein the plurality of openings in primary gas distributor (108) are directed downward at an angle of about 30°–45° from the verticle.

7. In a fluidized cracking catalyst regeneration apparatus comprising a vertical regenerator vessel, means for introducing spent catalyst into the lower portion of said vessel at a rate and under conditions to maintain catalyst undergoing regeneration as a fluidized dense phase bed superimposed by a dilute phase within said regenerator vessel, means for introducing a regeneration gas into the lower portion of said regenerator vessel, and means for withdrawing gaseous products of regeneration from the top of said regenerator vessel; the improvement which comprises:
 a. means for withdrawing regenerated catalyst from the upper portion of said fluidized dense phase bed contained in said regenerator vessel under conditions which do not disturb the homogeneity of said fluidized dense phase bed comprising a regenerated catalyst duct having open ends directed downwardly at an angle of about 45° to 60° from the vertical, wherein the upper end of said regenerated catalyst duct is external to and in communication with said regenerator vessel via an opening in the vertical wall of said regenerator vessel and
 b. a regenerated catalyst standpipe external to said regenerator vessel, comprising an upper cylindrical standpipe section having an opening in the side thereof, having a top and an opening therein and having an open bottom, and a lower conical standpipe section having an open top in communication with the lower open end of said upper standpipe section, and an open bottom, wherein a deaeration gas conduit provides communication between the opening in the top of said upper standpipe section and an opening in the upper portion of said regenerator vessel, and wherein the lower end of said regenerated catalyst duct is in communication with the opening in the side wall of said upper cylindrical standpipe section, for accumulating a bed of deaerated catalyst.

\* \* \* \* \*